Dec. 27, 1938.   E. C. HORTON   2,142,056
WINDSHIELD CLEARING SYSTEM
Filed March 7, 1936
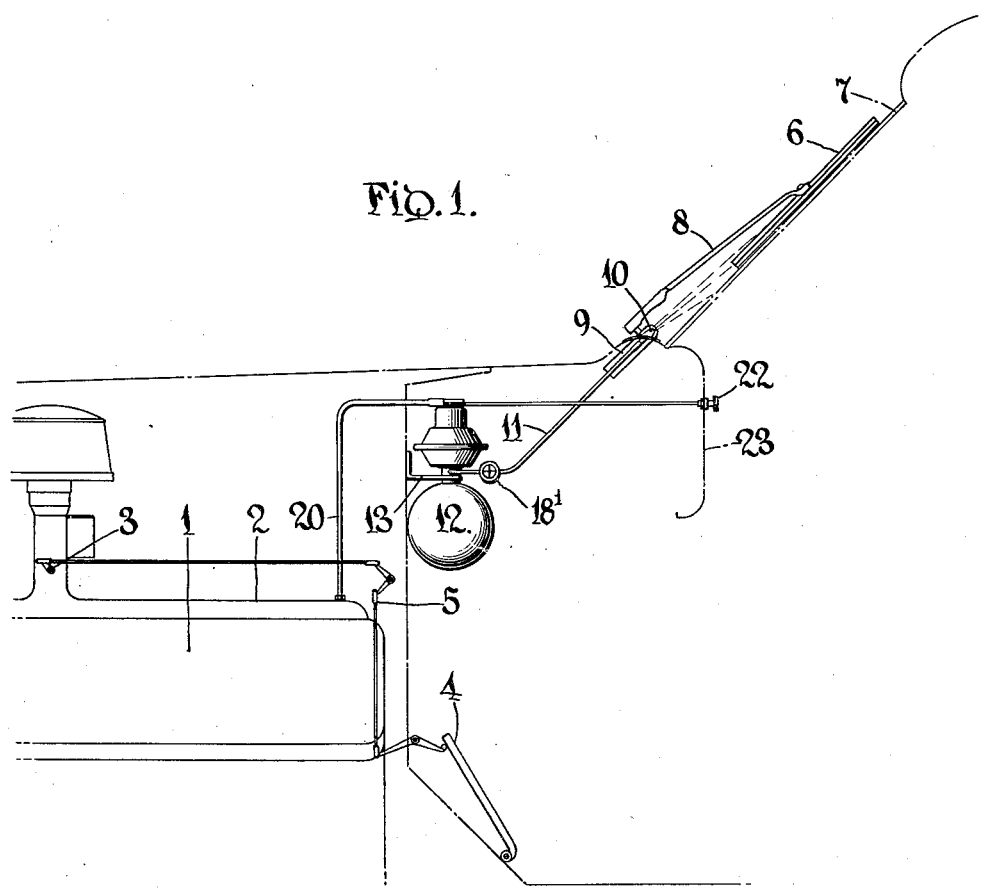
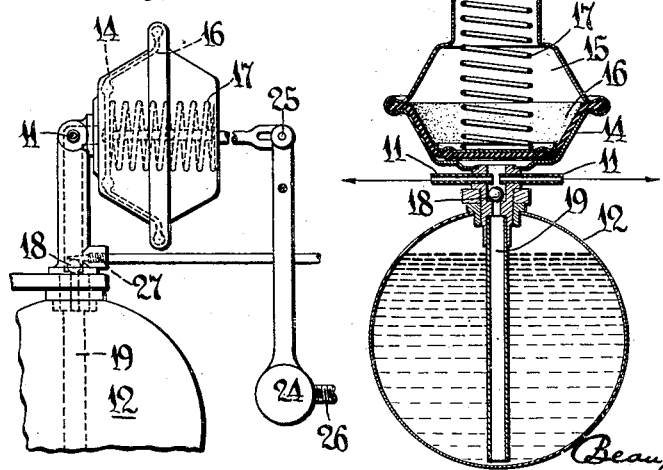
INVENTOR
Erwin C. Horton,
BY
Bean, Brooks, Buckley & Bean
ATTORNEYS Patented Dec. 27, 1938

2,142,056

UNITED STATES PATENT OFFICE 2,142,056

WINDSHIELD CLEARING SYSTEM

Erwin C. Horton, Hamburg, N. Y., assignor to Trico Products Corporation, Buffalo, N. Y.

Application March 7, 1936, Serial No. 67,721

16 Claims. (Cl. 20—40.5)

This invention relates to a windshield clearing system, and method of operating the same, wherein a fluid is sprayed or applied to a motor vehicle window for loosening such collected matter thereon that tends to obscure clear vision. The invention is applicable to the windows of vehicles which are equipped with automatic wipers, and may be used jointly with the wiper or separately therefrom as occasion may require.

It has heretofore been proposed to discharge a clearing fluid upon the windshield with adequate pressure behind it, as by means of a pump, but manual operation was required on its liquid expelling stroke and this detracted from full control of the vehicle. Furthermore, it has been designed to have the clearing fluid supplied in a continuous manner until a shut-off valve was closed. This latter proposal has required the motorist not only to remove his hand from the control of the vehicle but also to regulate and re-regulate the shut-off valve in order to vary the supply of the fluid to the ever changing conditions of travel.

The present invention has for its object to provide means for applying a quantity of cleaning fluid to the vehicle transparency in an automatic manner. Further, the invention has for its object to provide discharge means operable automatically with the control or operation of the motor vehicle. From one aspect, the invention utilizes means for delivering liquid onto the windshield automatically and without the intervention of the motorist to arrest its operation, and from another aspect the invention embodies means responsive to changes in operation or movement of the power plant or the vehicle itself for effecting the discharge of the fluid on the window, the change in motion or operation being a directive change, either permissive or positive, and made at the will of the motorist.

In the drawing,

Fig. 1 is a fragmentary skeletonized view of a motor vehicle equipped with a window clearing system embodying the present invention;

Fig. 2 is a sectional view through the fluid applicator unit of the system; and

Fig. 3 is a rather schematic showing of a modified embodiment of the invention.

Referring more particularly to the drawing, numeral 1 designates the internal combustion engine of the motor vehicle power plant, 2 the intake manifold thereof, 3 the engine throttle and 4 the accelerator pedal which is connected to the throttle by suitable linkage 5. Numeral 6 designates a wiper operable over the windshield or window 7 through means of the wiper carrying arm 8 which is driven by the motor 9 of any approved construction.

In a suitable location, preferably adjacent the mounting of the wiper carrying arm, is a discharge nozzle 10, so arranged as to discharge the clearing fluid on the windshield for wetting the glazed surface traversed by the wiper 6. The nozzle is connected by a conduit 11 to a reservoir 12 serving as a source of supply for the clearing fluid, the reservoir being mounted in a convenient location by a bracket 13. The location illustrated is on the inside of the dash where it will not only be readily accessible but the fluid will partake of the surrounding heat for a more efficient loosening action on icy deposits on the window when applied thereto.

The fluid applicator unit, of which the reservoir 12 may be considered a part, comprises a pump or wet chamber 14 and a motor or dry chamber 15. In the particular disclosure, the two chambers are separated by a common movable wall 16 which is normally urged by a spring 17 to a position for ensmalling the pump chamber and discharging the fluid therefrom through the pipe 11 onto the windshield. The pump chamber has a valved inlet 18 and connecting pipe 19 through which communication is had with the lower portion of the reservoir. This check valve 18 serves to hold the liquid in the conduits 11 against returning to the reservoir, and since the nozzles 10 are directed upwardly it will be observed that the liquid will be promptly discharged therefrom immediately upon spring 17 starting to function, an outlet check valve 18' being inserted in the conduit 11 to hold the liquid in the nozzle during the intaking stroke of the pump.

In the present disclosure, the wall 16 is movable by a motor to enlarge the pump chamber for taking in a charge of the clearing fluid from the reservoir 12. The motor is herein operated automatically and incidental to the manipulative control of the motor vehicle. By way of example, the motor may be fluid actuated, as in Fig. 2, wherein the motor chamber is connected to the accelerator pedal 4 through the air column confined by conduit 20 which connects to the intake manifold. This fluid link is made to reciprocate by actuating the pedal incidental to operation of the vehicle.

As the suction influence in the manifold varies, the pressure fluid will ebb and flow through the passage 20 and, jointly with the spring 17, cause operation of the movable wall 16. When the suction influence increases with the closing of the throttle, the fluid pressure differential acting on the wall will counteract and overcome the urge of spring 17 and cause the cleaning fluid to be forced upwardly from the reservoir into the wet chamber 14, the reservoir being open to the atmosphere through a suitable bleed aperture (not shown). When the accelerator pedal is next depressed to open the engine throttle, the fluid pressure in the motor chamber 15 will drop to permit the spring to become dominant and thus move the wall 16 to ensmall the pump chamber for discharging the cleaning fluid through the conduit 11 and nozzle 10. Where twin wipers are used, two outflow pipes 11 will be provided, as illustrated in Fig. 2, so that each wiper will have its own individual application of the cleaning fluid. Therefore, each time the accelerator pedal is depressed, a quantity of the cleaning fluid will be discharged on the windshield, and each time the accelerator pedal is released the suction influence in the intake manifold will be increased to intake a new supply of the cleaning fluid from the reservoir 12. The movement of the diaphragm or wall 16 is responsive in substantial correspondence with the rise and fall of the mean effective pressure in the intake manifold when such pressure is sufficient to counteract and overcome the force of the spring 17.

A rapid acceleration or deceleration of the vehicle, by its manipulative control or controls, may be made to excite quick action of the spray unit, if and when desired. The operation of such unit is accomplished by a change in the manipulative operation of the vehicle and may be effected either by a fluid pressure actuated pump, or otherwise, as, for example, by an inertia actuated member 24, Fig. 3, solely or jointly with the spring 17. If jointly used with the spring, a play connection 25 with the member 24 will be desirable. A stop 26 may be provided to make the weight or member 24 responsive solely to braking operation, although a transposition of the stop will render the weight responsive to accelerating movement. The spray may be discontinued by suitable means, such as the valve 27.

When it is not desired to use the applicator unit a regulating valve 21, interposed in the suction passage 20, will be closed. In this connection it will be observed that by regulating the valve 21 the discharge of cleaning fluid may also be regulated, both as to volume and intensity of discharge. This will avoid waste of the fluid which is thrown onto the windshield. Furthermore, by a quick release and depressing movement of the accelerator pedal the extent of pumping action of the wall 16 may be approximately determined to regulate the volume of the discharge on the window. The control valve 21 will be readily accessible to the motorist as by locating the actuating knob 22 on the instrument panel 23.

It will, therefore, be obvious that the discharge of the cleaning fluid on the window will be effected by and during operation of the motor vehicle. If the motorist desires a supply of the cleaning fluid at any time, it is only necessary to momentarily vary his engine control to provide the pressure differential or the inertia change. The application of the cleaning fluid is, therefore, automatic and does not necessitate the motorist removing his hand from the control of the vehicle in order to apply the cleaning fluid when his field of vision becomes obscured.

While the present disclosure has been described in detail, it is not desired to restrict the invention to the particular embodiment illustrated, since obviously the inventive principle herein involved may be embodied in other physical forms and the scope of the claims will readily suggest many changes and substitutions to those skilled in the art, without departing from the spirit of the invention.

What is claimed is:

1. A window clearing system for motor vehicles having a power plant and a manipulative control therefor, comprising in combination with such control, automatic means for discharging clearing fluid on the vehicle window for a predetermined interval of time, and means responsive to changes in the manipulative control for setting said discharge means in operation.

2. A window clearing system for motor vehicles having an internal combustion plant with a manifold pressure influence subject to variation incidental to engine throttle position, comprising in combination with such manifold, pump means for discharging clearing fluid on the vehicle window, means for actuating said pump means, said actuating means being responsive to changes in the manifold pressure influence for arresting the action of said pump means, and means for regulating the actuation of said pump means.

3. A fluid applicator unit for windshield clearing systems, comprising a reservoir and a suction operated pump having a self-return piston, and means for connecting the pump to a source of variable suction for moving the piston from its normal position for intaking fluid from the reservoir, when the suction is sufficient, for subsequent discharge, when the suction is insufficient.

4. A fluid applicator unit for window clearing systems for motor vehicles, comprising a reservoir and a fluid pressure actuated pump having its inlet connected to the reservoir and its outlet adapted for connection to a discharge nozzle adjacent the window, said pump being mounted on the reservoir and comprising a pump chamber, a motor chamber and piston means operated back and forth between the two chambers, the motor chamber having a pressure port for communication with a source of pressure for moving the piston in one direction, and means for returning the piston in the opposite direction.

5. A fluid applicator unit for windshield clearing systems of motor vehicles, comprising a reservoir, and a motor actuated pump supported by the reservoir and operable by the manipulative control of the vehicle.

6. A fluid applicator unit for windshield clearing systems of motor vehicles, comprising a reservoir, and an inertia actuated pump connected thereto and supported thereby for intermittent actuation during vehicular travel.

7. A window clearing system for motor vehicles having an internal combustion plant with a source of pressure influence wherein the pressure is subject to variation incidental to engine operation, comprising, in combination with such source of pressure influence, a reservoir, a pump for being connected to the reservoir and having a reciprocable wall operating on one stroke to take in a charge of fluid from the reservoir and on the return stroke to expel the charge of fluid on the vehicle window, and means connecting the pump to the plant for having the pressure influence of a predetermined intensity act on the wall to move it on one stroke, said pump embodying a construction for automatically effecting an opposite stroke of the wall in the absence of such predetermined pressure influence.

8. A window clearing system for motor vehicles having an internal combustion plant with a source of pressure influence wherein the pressure is subject to variation incidental to engine operation, comprising, in combination with such source of pressure influence, a reservoir, a pump for being connected to the reservoir and having a reciprocable wall operating on one stroke to take in a charge of fluid from the reservoir and on the return stroke to expel the charge of fluid on the vehicle window, means connecting the pump to the plant for having the pressure influence of a predetermined intensity act on the wall to move it on one stroke, and a spring normally acting on the wall for moving the same on the opposite stroke in the absence of predetermined pressure influence, said spring being of a strength adapted to be counteracted and overcome by the pressure influence of such predetermined intensity whereby the pump is intermittently actuated and arrested as the pressure influence varies above and below such predetermined intensity.

9. A window clearing system for a motor vehicle, comprising an upwardly directed discharge nozzle mounted adjacent the lower edge of a window, automatic means for delivering a predetermined volume of liquid under pressure to the nozzle for a predetermined time interval for discharge upwardly onto the window, means operable from the power plant of the vehicle for setting said automatic means for operation for such time interval, and manually controlled means for rendering said setting means operative and inoperative.

10. A window clearing system for a motor vehicle having a power plant, comprising a discharge nozzle mounted adjacent a window of the vehicle for directing a jet of liquid onto the window, automatic means for delivering liquid under pressure to the nozzle for a predetermined time interval, and means forming a part of the power plant for setting said automatic means in operation.

11. A window clearing system for a motor vehicle, comprising a discharge nozzle mountable adjacent a window for directing a stream of liquid issuing therefrom on to the window, means for delivering liquid to the nozzle under pressure for discharge on to the window, said discharge nozzle being directed toward the window in an upward direction whereby the liquid remaining in the nozzle after the arrest of said delivery means is retained therein against leakage from the nozzle on to the glass, means operable from the power plant of the vehicle for setting said delivery means in operation, and automatic means for holding the liquid in the nozzle against retrograde movement.

12. A window clearing system for a motor vehicle having a power plant, comprising in combination with the power plant as a source of power, automatic means for discharging clearing fluid on to the vehicle window for a predetermined time interval, and means operable from the power plant for setting said discharge means in operation for such time interval.

13. A window clearing system for a motor vehicle, comprising means for discharging clearing fluid on a window of the vehicle, automatic means for delivering a measured quantity of clearing fluid to the discharge means at a substantially predetermined pressure and for a substantially predetermined interval of time whereby the discharge of clearing fluid from the discharge means will be substantially uniform in its application and in its result, means for transmitting power from the power plant of the vehicle to said automatic means for positioning the latter to operate for such time interval, and manually controlled means for interrupting the transmission of power.

14. A window clearing system for a motor vehicle, comprising a discharge nozzle mounted outwardly from a window and disposed toward the lower edge thereof for directing an issuing stream of liquid on to the window, means communicating with the nozzle for delivering liquid to the nozzle under pressure for discharge on to the window, said discharge nozzle being directed toward the window in an upward direction whereby after the arrest of said delivery means the liquid remaining in the nozzle is retained therein against dripping from the nozzle on to the cleaned glass to obscure vision therethrough, means connecting said delivery means to the power plant of the vehicle for effecting operation of said delivery means, and check valve means acting to hold the liquid in the nozzle against return to said delivery means when the latter is inoperative.

15. A window clearing system for motor vehicles having an internal combustion plant with a source of pressure influence, comprising, in combination with such source of pressure influence, a reservoir, a pump connected to the reservoir and having a reciprocable wall operating on one stroke to take in a charge of fluid from the reservoir and automatically returnable on the reverse stroke to expel the charge of fluid on the vehicle window, and means for interrupting the connection between the pump and the source of pressure influence.

16. A window clearing system for motor vehicles having an internal combustion plant with a source of pressure influence, comprising, in combination with such source of pressure influence, a reservoir, a nozzle for discharging fluid on the window, a pump interposed between the nozzle and the reservoir and having a reciprocable wall operating on one stroke to take in a charge of fluid from the reservoir and on the reverse stroke to expel the charge of fluid through the nozzle onto the vehicle window, said pump being connected to the source of pressure influence for having its reciprocable wall actuated by fluid pressure differential on one stroke, means for actuating the reciprocable wall on the opposite stroke in the absence of a counteracting pressure differential, and means for interrupting the connection between the pump and the source of pressure influence.

ERWIN C. HORTON.